(12) United States Patent
Obersteiner et al.

(10) Patent No.: US 6,846,049 B2
(45) Date of Patent: Jan. 25, 2005

(54) VALVE MECHANISM, ESPECIALLY FOR ANTI-SKID AUTOMOTIVE BRAKE SYSTEMS

(75) Inventors: Georg Obersteiner, Idstein (DE); Josef Lauer, Nonnweiler (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/451,749

(22) PCT Filed: Dec. 17, 2001

(86) PCT No.: PCT/EP01/14875
§ 371 (c)(1),
(2), (4) Date: Jun. 23, 2003

(87) PCT Pub. No.: WO02/051683
PCT Pub. Date: Jul. 4, 2002

(65) Prior Publication Data
US 2004/0041468 A1 Mar. 4, 2004

(30) Foreign Application Priority Data
Dec. 27, 2000 (DE) .......................................... 100 65 235
Jan. 31, 2001 (DE) .......................................... 101 04 241

(51) Int. Cl.$^7$ ................................................ B60T 8/36
(52) U.S. Cl. ................................ 303/119.2; 137/596.17; 251/129.15
(58) Field of Search .......................... 303/119.2, 119.1, 303/900, 901, 119.3, 116.1; 137/630.14, 630.15, 630.17, 630.22, 511, 596.17, 596.21; 251/129.15, 129.02

(56) References Cited

U.S. PATENT DOCUMENTS

| | | | | |
|---|---|---|---|---|
| 5,522,426 A | * | 6/1996 | Zutt et al. .............. | 137/599.01 |
| 5,683,150 A | * | 11/1997 | Burgdorf et al. ......... | 303/116.1 |
| 6,084,493 A | * | 7/2000 | Siegel ................... | 335/278 |
| 6,189,983 B1 | * | 2/2001 | Volz et al. .............. | 303/119.2 |
| 6,267,569 B1 | * | 7/2001 | Alaze .................... | 417/470 |
| 6,382,250 B1 | * | 5/2002 | Gruschwitz et al. ....... | 137/601.14 |
| 6,644,623 B1 | * | 11/2003 | Voss et al. ............. | 251/129.15 |

FOREIGN PATENT DOCUMENTS

| | | |
|---|---|---|
| DE | 3233268 A1 | 3/1984 |
| DE | 4230393 A1 | 3/1994 |
| DE | 42 30 393 A1 | 3/1994 |
| DE | 19537659 A1 | 4/1997 |
| DE | 19710353 A1 | 9/1998 |
| DE | 199 36 711 A1 | 1/2001 |
| DE | 199 51 665 A1 | 5/2001 |
| EP | 0 673 815 A2 | 9/1995 |

OTHER PUBLICATIONS

International Search Report of PCT/EP01/14875 dated May 28, 2002.

German Search Report for Application No. 10104241.8 dated Nov. 25, 2003.

* cited by examiner

*Primary Examiner*—Matthew C. Graham
*Assistant Examiner*—Mariano Sy
(74) *Attorney, Agent, or Firm*—RatnerPrestia

(57) ABSTRACT

The present invention relates to a valve assembly whose first valve accommodating member is conformed to the inside diameter of a second valve accommodating member in such a fashion that the first valve accommodating member is inserted without clearance so far into the second valve accommodating member that the first valve closure member is supported either on a bore step of a second pressure fluid passage or on the first valve accommodating member.

6 Claims, 2 Drawing Sheets

US 6,846,049 B2

VALVE MECHANISM, ESPECIALLY FOR ANTI-SKID AUTOMOTIVE BRAKE SYSTEMS

TECHNICAL FIELD

The present invention relates to a valve assembly, in particular for slip-controlled automotive vehicle brake systems.

BACKGROUND OF THE INVENTION

A valve assembly is, e.g., disclosed in German patent application DE 42 30 393 A1 that is comprised of a parallel connection of a spherical non-return valve and another electromagnetically actuatable valve closure member. This valve assembly suffers from the disadvantage that the construction chosen produces the effect of a high dynamic pressure and a flow cross-section that limits the flow rate in the area of the spherical non-return valve. Furthermore, the spherical non-return valve is positioned in the area of housing edges that, under certain circumstances, may also have an undesirable effect on the flow performance and the reliability of operation of the spherical non-return valve. The construction makes use of predominantly massive housing components that are complicated to manufacture.

In view of the above, an object of the present invention is to improve upon a valve assembly of the type referred to hereinabove in such a way that the shortcomings indicated are overcome in order to achieve in particular a minimum possible dynamic pressure at the spherical non-return valve and a reduced load on the supporting surfaces for the spherical non-return valve, while another objective is to ensure a maximum possible passage in the area of the spherical non-return valve in consideration of the above-mentioned criteria.

DETAILED DESCRIPTION OF THE PREFERRED EMBODIMENTS

Figure 1:
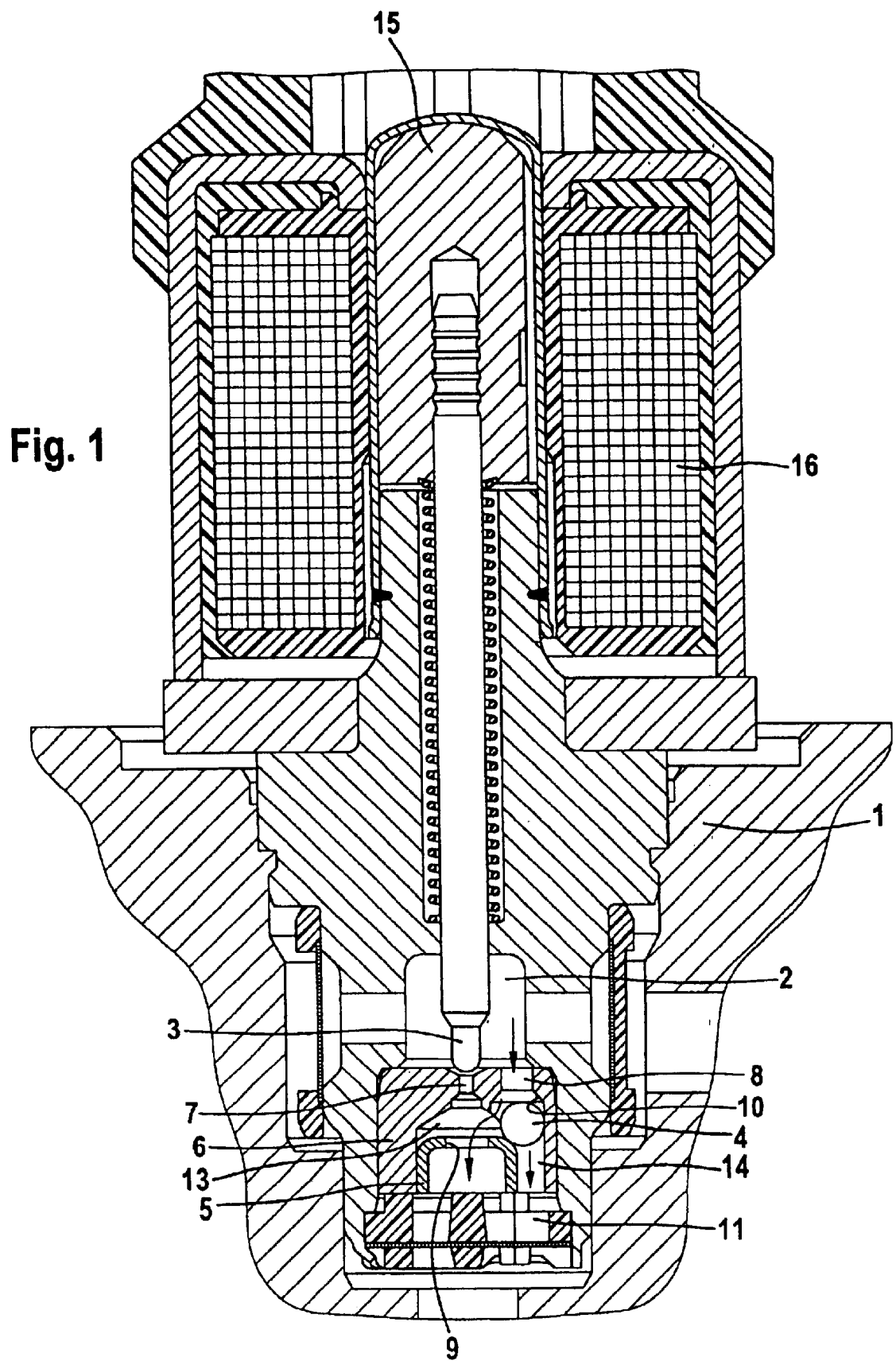
FIG. 1 is the overall cross-sectional view of a valve assembly including a two-part valve-accommodating member inserted from below into the opening of the valve housing.

FIG. 1 depicts in a considerably enlarged view of a valve assembly for use in a slip-controlled automotive vehicle brake system, including a first valve closure member 4 that is configured as a hydraulically actuatable spherical non-return valve, as well as another valve closure member 3 controllable by means of a magnet armature 15 and a magnetic coil 16, the valve closure member 3 being arranged in a valve accommodating bore 2 of the valve housing 1. Both valve closure members 3, 4 in the valve housing 1 are, thus, controllable irrespective of one another in terms of effect. The hydraulically actuatable spherical non-return valve is a component part of a construction unit formed of a first and a second valve-accommodating member 5, 6, the construction unit having a first pressure fluid passage 7 that is centrically arranged in the second valve accommodating member 6 and closable by means of the second valve closure member 3. Adjacent to the first pressure fluid passage 7 in the second valve accommodating member 6 is another, a second pressure fluid passage 8, which is adapted to be closed and opened by the first valve closure member 4 described hereinabove. The outside diameter of the first valve accommodating member 5 is conformed to the inside diameter of the second valve accommodating member 6 in such a way that the first valve accommodating member 5 is inserted without clearance into the second valve accommodating member 6, preferably by means of a press fit, so that the first valve closure member 4 can be supported on a bore step 10 in the second pressure fluid passage 8 or on the first valve accommodating member 5. The second pressure fluid passage 8 forms branches as the arrow shows along the external surface of the first valve accommodating member 5 in the direction of the frontal and peripheral surface so that pressure fluid flows, in the open condition of the valve closure member 4 in the pressure fluid passage 8, partly through an opening 9 in the end surface of the valve accommodating member 5 and partly along the peripheral surface of the first valve accommodating member 5 that defines the second pressure fluid passage 8. The first valve accommodating member 5 is composed of a sleeve shaped like a bowl, which is deep drawn from band steel and subsequently tempered in the area of the surface acted upon by the first valve closure member 4. In contrast thereto, the second valve accommodating member 6 is a solid, preferably metal turned part whose centrically arranged first pressure fluid passage 7 is configured as a stepped bore expanded like a funnel in a downward direction, the first stepped portion 13 of the bore passing over into the expanded second stepped portion 14 of the second pressure fluid passage 8 arranged in parallel to the first pressure fluid passage 7, whereby a pressure fluid connection of both pressure fluid passages 7, 8 is achieved. The depth of the second stepped portion 14 is chosen to be in excess of the depth of the first stepped portion 13 for the accommodation and functioning of the first valve closure member 4 between the two valve accommodating members 5, 6 and for the internal channel branching between the first and second pressure fluid passage 7, 8. It is especially well suited to use a steel ball as the first-valve closure member 4 which is inserted into the expanded second stepped portion 14 and safely positioned in the second valve accommodating member 6 by means of the mechanically stiff rounding of the first valve accommodating member 5 inserted into the first stepped portion 13. The first valve accommodating member 5 is additionally secured by a plate-type filter 11 that is inserted from below into the valve accommodating bore, thereby preventing the first valve accommodating member 5 and the first valve closure member 4 from dropping out of the valve assembly.

The selected illustration of FIG. 1 depicts an electromagnetic valve that is normally open in its basic position and whose valve housing 1 is exemplarily designed in a cartridge-type construction and calked in a block-shaped carrier of a slip-controlled brake system.

Figure 2:
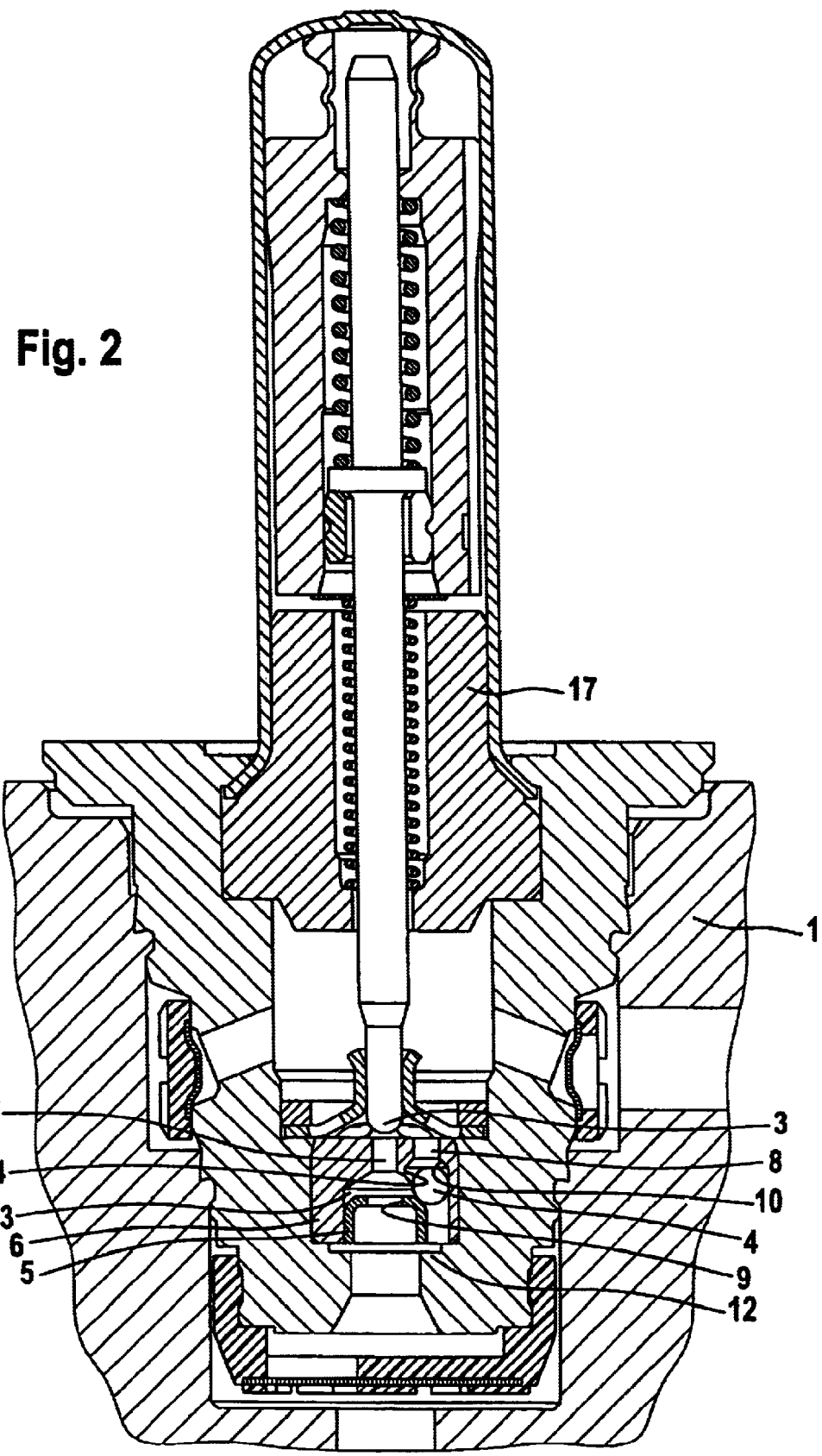
FIG. 2 is the overall cross-sectional view of a valve assembly including a two-part valve-accommodating member inserted from above into the opening of the valve housing, with a suitable projection at the valve housing for preventing the valve closure member from dropping out of the valve-accommodating member.

Different from the preceding embodiment FIG. 2 shows an electromagnetic valve that is likewise normally open in its basic position and wherein an excess-pressure valve function is additionally integrated that is realized by a spring-biased valve closure member 3. In response to a defined hydraulic opening pressure, said valve closure member 3 may move relative to the position of the magnet armature in order to open the first pressure fluid passage 7 in the second valve accommodating member 6 in case of need, irrespective of the electromagnetic energization of the magnet armature 15. The design of the assembly of the first and second valve accommodating member 5, 6 and the first valve closure member 4 integrated therein as well as the arrangement of the pressure fluid passages 7, 8 principally correspond to the above-mentioned embodiment of FIG. 1.

However, it is a vital difference of the valve assembly of FIG. 2 over FIG. 1 that the direction of installation is reverse and the second valve accommodating member 6 is fixed in the valve accommodating bore 2, so that end member 6 is supported on a step of the valve housing 1. At an axial distance from the lower end surfaces of both valve accommodating members 5, 6, there is a projection 12 at the valve housing 1 below the valve housing step, the projection covering the first valve accommodating member 5 to such an extent that, in the event of inadvertent detachment of the first valve accommodating member 5, it so may slip only by the small axial distance in a downward direction out of the second valve accommodating member 6 so that the operating safety of the first valve closure member 4 interposed between the two valve accommodating members 5, 6 is always safeguarded. A sufficient flow connection to the second pressure fluid passage 8 by way of opening 9 would be ensured in such a condition, while the second pressure fluid passage 8 downstream of the spherical non-return valve would be shut off by way of exception in the direction of the plate-type filter 11 due to the lowered first valve accommodating member 5.

Principally, the spherical valve closure member 4 always moves in dependence on a hydraulic differential pressure either in the closing sense in an upward direction towards the bore step 10 acting as a conical sealing seat, or in the opening sense in a downward direction against the curved shoulder of the bowl-shaped valve accommodating member 5, whereby fluid may circulate around the valve closure member 4 with low losses due to the generous opening cross-sections in the stepped portions 13, 14.

The valve assembly presented in FIGS. 1 and 2 is advantageous because the pressure fluid flow is not only suitably branched in the direction of the first and second stepped portion 13, 14 by way of the first valve closure member 4, but additionally a larger flow cross-section is achieved in the area of the spherical non-return valve around which fluid circulates, with minimum dynamic pressure, so that exemplarily the valve seat in the valve accommodating member 6 that carries the valve closure member 3 may be diminished in the excess pressure valve described in FIG. 2.

The further result is the advantage that the force of the spring arranged between the magnet armature 15 and the tappet portion at the valve closure member 3 may be reduced considerably so that the load on the valve seat associated with the first pressure fluid passage 7 will automatically decrease as well, causing in turn a reduced wear of the valve seat.

Likewise the stress the valve sleeve enclosing the magnet armature 15 suffers from when the magnet armature 15 strikes against the valve sleeve dome will decrease considerably because now the resetting spring compressed between the magnet armature 15 and the magnet core 17 may also be rated to become weaker, thereby minimizing the striking impulse at the valve sleeve after termination of the electromagnetic energization.

The stiff supporting contour between the bowl bottom and the bowl edge that is curved like a bowl in an upward direction and on which contour the first valve closure member 4 is supported, represents another major contribution to minimizing the stress on the edges in the valve accommodating members 1, 2, because the spherical non-return valve in the present embodiment moves to bear against the zone of curvature at the first valve accommodating member 5 that is favorable in terms of strength wear in the form of edge abrasion is consequently prevented in an efficient fashion by the geometry of the first valve accommodating member 5.

Another advantage is achieved by the fact that due to the decentralized arrangement of the first valve closure member 4 in the second stepped portion 14, the spherical non-return valve respectively exerts an unsymmetrical load on the first valve accommodating member 5 which at most causes an additional favorable wedging of the first valve accommodating member 5 in the second valve accommodating member 6 so that during operation of the spherical non-return valve a clamping force is additionally superposed on the press-in force at the valve accommodating member 5, the clamping force representing another safety mechanism to prevent the first valve accommodating member 5 from getting detached from the second valve accommodating member 6.

What is claimed is:

1. Valve assembly for slip-controlled automotive vehicle brake systems, comprising:

a first valve closure member that is configured as a hydraulically actuatable spherical non-return valve, as well as a second valve closure member controllable electromagnetically by means of a magnet armature and a magnet coil, said second valve closure member being arranged in a valve accommodating bore including the first valve closure member and disposed in the valve housing in which the valve assembly is received, wherein both valve closure members in the valve housing are controllable irrespective of one another in terms of effect, including a first and a second valve accommodating member grouped in a construction unit having a first centric pressure fluid passage in the second valve accommodating member that is closable by means of the second valve closure member, and including a second pressure fluid passage that is adjacent to the first pressure fluid passage in the second valve accommodating member and closable by the first valve closure member, wherein an outside diameter of the first valve accommodating member is conformed to an inside diameter of the second valve accommodating member in such a way that the first valve accommodating member is inserted without clearance so far into the second valve accommodating member that the first valve closure member is supported either on a bore step in the second pressure fluid passage or on the first valve accommodating member, and wherein the second valve accommodating member is a turned metal part whose centric first pressure fluid passage is configured as a stepped bore whose expanded first stepped portion cuts across an expanded second stepped portion of the second pressure fluid passage arranged in parallel to the first pressure fluid passage.

2. Valve assembly as claimed in claim 1, wherein the second pressure fluid passage forms branches along the external surface of the first valve accommodating member in the direction of the frontal and peripheral surface of the first valve accommodating member in order to conduct pressure fluid in the second pressure fluid passage, partly through a central opening in the first valve accommodating member and partly along a decentralized wall portion of the first valve accommodating member that defines the second pressure fluid passage.

3. Valve assembly as claimed in claim 1, wherein the first valve accommodating member is composed of a sleeve shaped like a bowl, which is deep-drawn from steel.

4. Valve assembly as claimed in claim 1, wherein the depth of the second stepped portion is chosen to be in excess of the depth of the first stepped portion for the accommodation of the first valve closure member and for the internal pressure fluid branching of the first and the second pressure fluid passage.

5. Valve assembly as claimed in claim 1, wherein the first valve closure member is preferably a steel ball that is inserted into the expanded second stepped portion of the second valve accommodating member and retained in the second valve accommodating member by the first valve accommodating member inserted into the first stepped portion.

6. Valve assembly as claimed in claim 1, wherein the first valve accommodating member as a fixing mechanism in the second valve accommodating member is covered by a projection of the valve housing or by a plate-type filter that is arranged in the valve housing.

* * * * *